April 5, 1938. B. C. CAUDRY 2,113,191
LAWN MOWER
Filed July 24, 1936 3 Sheets-Sheet 2
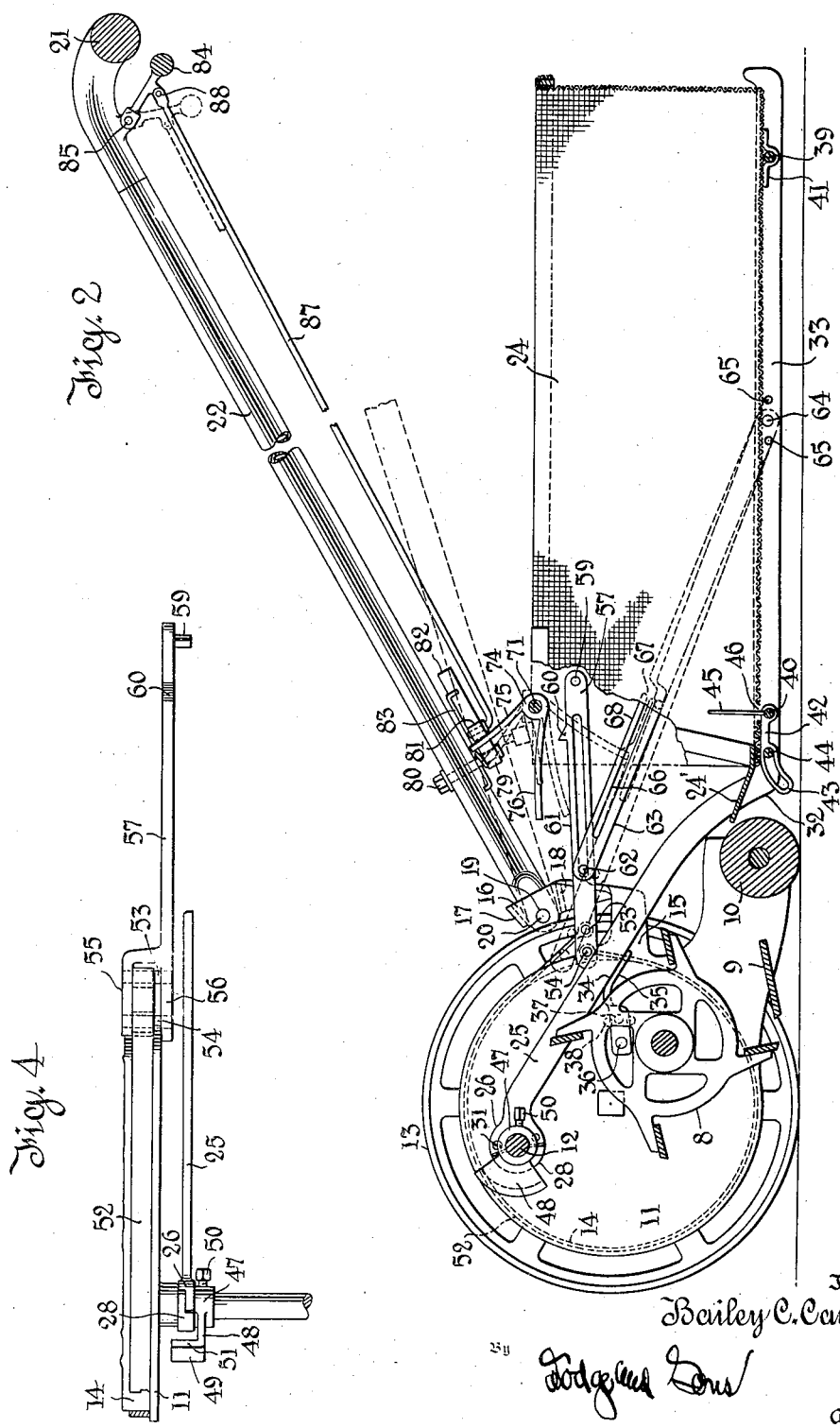
Inventor
Bailey C. Caudry
By
Attorneys

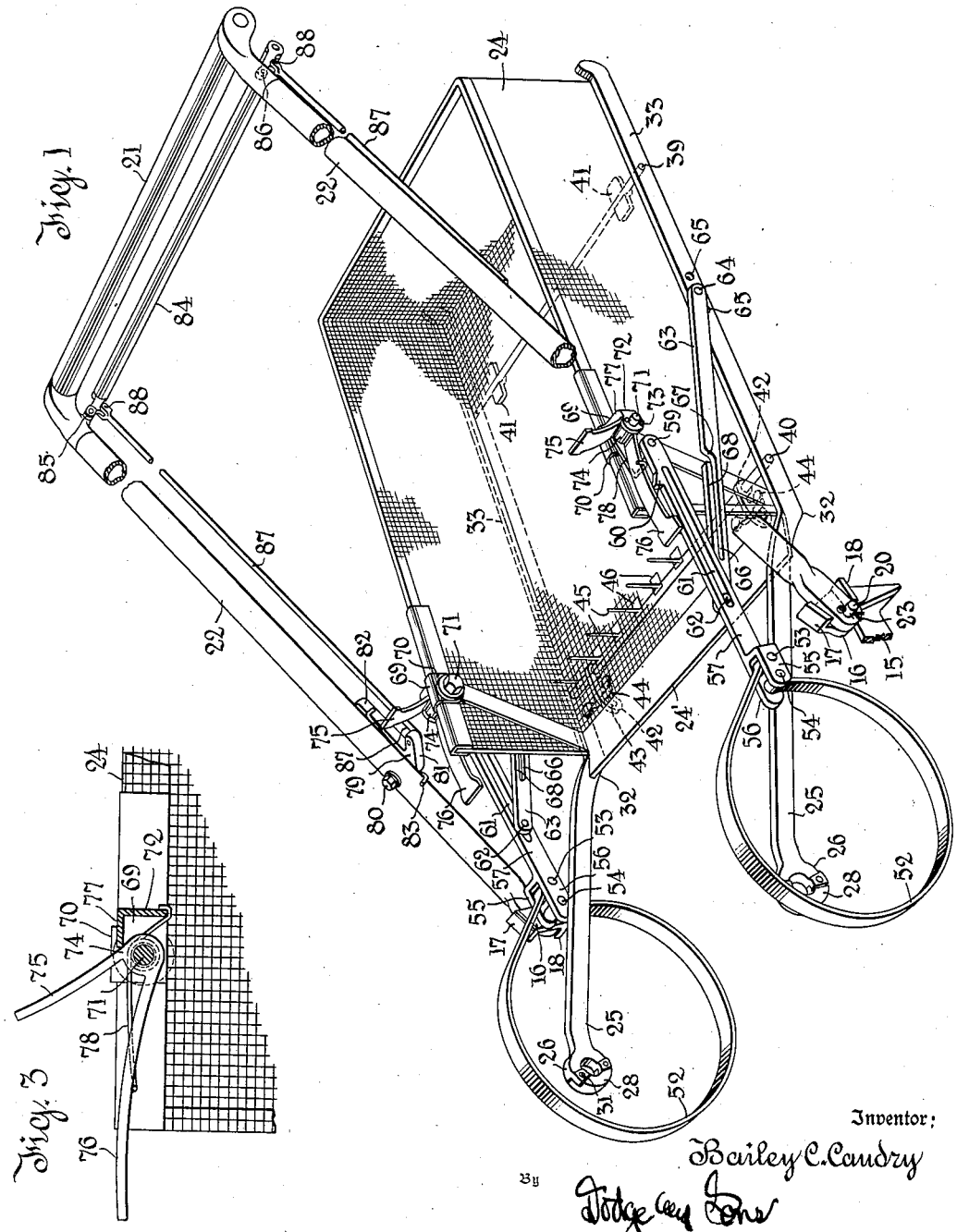

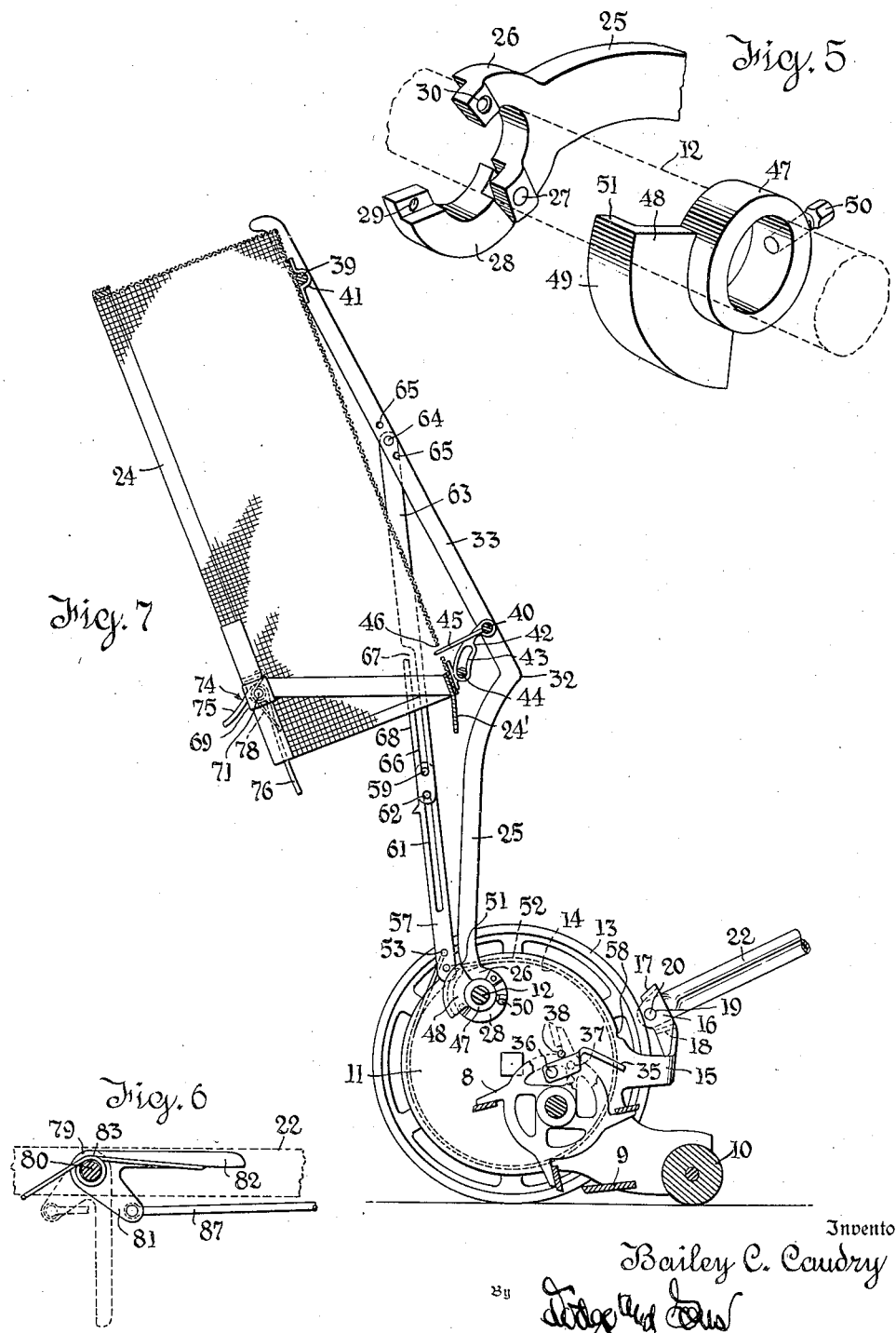

Patented Apr. 5, 1938

2,113,191

UNITED STATES PATENT OFFICE 2,113,191

LAWN MOWER

Bailey C. Caudry, Coffeyville, Kans.

Application July 24, 1936, Serial No. 92,429

17 Claims. (Cl. 56—200)

This invention relates to lawn mowers and particularly to grass catchers therefor.

The primary purpose of the invention is to provide a lawn mower having grass catching means adapted to receive the cut grass at the rear of the cutting means and then convey the grass above the cutting means to the front of the machine where it is dumped.

A further important object is the utilization of the power derived from movement of the traction wheels of the mower automatically to actuate the grass receiving means, when full, to cause the receiving means to dump its load of grass. The same source of power also serves to return the grass catching means to normal, grass catching position after the load has been dumped.

Simplicity of operation and construction feature the grass catching and dumping device of the present invention which is designed so that it may be applied to standard lawn mowers with a minimum of changes in the mower mechanism proper. A further feature is the facility with which the grass catching device may be mounted on or removed from the mower.

Another important object is the designing of the grass catching device and its location on the mower so as to balance the entire assembly and thus increase the traction of the ground engaging wheels. Means are provided for resiliently supporting the grass catching device in place in order to absorb ground shocks. These supporting means are also made adjustable to compensate for adjustment of the ground roller of the mower to vary the height above the ground at which the grass cutting means operate.

Other objects and features will appear from the following detailed description and the practical embodiment of the invention shown in the accompanying drawings, wherein:—

Figure 1 is a perspective view of the grass catching and dumping means in the normal, grass receiving position which it assumes on the mower, the mower proper being omitted, however, except for the operating handle and its connections with the mower frame;

Fig. 2 is a longitudinal central section through the mower proper and the grass catcher, with the parts appearing in solid lines in the position shown in Fig. 1;

Fig. 3 is a fragmentary side elevation of one of the clutch operating levers mounted on the grass catcher basket;

Fig. 4 is a fragmentary plan of one of the clutches for operating the basket dumping means;

Fig. 5 is a perspective of the inner end of one of the grass basket supporting sills and associated collar, the mower tie rod on which they are mounted being shown in dotted lines;

Fig. 6 is a plan of one of the actuating fingers on the main pusher handle of the mower, the handle appearing in dotted lines for sake of clearness; and Fig. 7 is a view similar to Fig. 2, with the grass basket in dumping position.

As shown in the drawings, the mower proper, which is of conventional construction except as explained later, includes the usual cutting reel 8, stationary cutter bar 9 and vertically adjustable ground roller 10, all supported at their opposite ends in the frame of the mower proper. Since the right and left hand portions of the mower and grass catching means are the same, only the right hand portion thereof (viewed from the handle end of the mower) will be described.

The mower frame comprises the usual upright plate 11 at each side in which reel 8, cutter bar 9 and roller 10 are mounted. These side plates are connected together by the usual tie rod 12. Rotatably and detachably mounted on the outside of each plate is a traction or ground wheel 13 having a cylindrical, inwardly projecting hub 14 in which is located the gear mechanism for transmitting the motion of the ground wheels to the cutter reel 8.

Each side plate 11 has an ear 15 which extends rearwardly and around the rim of ground wheel 13. Ear 15 terminates in an upright portion 16 having a pair of spaced, inclined lugs 17, 18, with a perforation 19 located therebetween. A headed pin 20 is located in each opening 19. The handle of the mower, which is of the bail type, comprises a pusher bar 21 and metal, tubular side bars 22. The lower end of each bar 22 is flattened and perforated to receive pin 19, and a cotter pin 23 secures the pin in place. With this arrangement, the handle is pivotally mounted on the mower frame, the vertical, pivotal movement thereof in opposite directions being limited, however, by lugs 17, 18. The handle is shown in the several figures in the position which it occupies when grasped by the operator in use.

The grass catcher receptacle or basket 24, which preferably is made principally of woven wire and has a sheet metal lip 24' projecting over ground roller 10, is supported at the rear of the mower by a pair of sills 25, 25, located at the sides of the basket. Each sill 25 is formed at its inner end with a semi-circular portion 26 which receives tie rod 12 of the mower frame (see Fig. 5 particularly). Pivotally attached at 27 to arcuate end portion 26 of the sill is a semi-circular, arcuate member 28, the free extremities of arcuate portion 26 and member 28 being perforated and threaded at 29 and 30, respectively, to receive a machine screw 31 (Fig. 1). Thus sills 25, 25, are pivotally and removably mounted on tie rod 12.

Each sill or carrier 25 is bent at 32 so as to form a horizontal portion 33 located substantially parallel and close to the ground (Fig. 2). At 34 each sill normally rests upon a spring metal bumper 35 mounted on side plate 11. Bumper 35 is pivotally connected to plate 11 at 36, but its rotation is prevented by engagement of a recess 37 in the bumper with one of a series of lugs 38 on side plate 11. Thus, as ground roller 10 is raised or lowered to change the height at which the reel cuts the grass, bumper 35 may be moved to engage a different lug 38 to compensate for this adjustment, and thereby maintain the parts in the same relative positions.

It is important to note that the mower and grass catcher assembly above described provides a balanced arrangement whereby the weight of the grass catcher increases the traction of the ground wheels 13. This is due to the design of the grass catcher and the manner in which it is mounted on the mower, with sills 25 attached to tie rod 12 forwardly of the axis of wheels 13, and the sills bearing on bumpers 35 between the axis of wheels 13 and the axis of ground roller 10.

Sills 25 are connected by a pair of tie rods 39, 40, which form a rigid frame therewith. Basket 24 normally rests upon tie rods 39, 40, as shown in Fig. 2, in which position the basket receives the grass from cutter reel 8. Clips 41, soldered to the bottom of the basket, provide a pivotal connection between the outer end of the basket and the sill frame. Pivotally mounted on tie rod 40 is a pair of links 42. The outer end of each link 42 has a curved slot 43 through which extends a clip 44 soldered to the bottom of the basket, thereby providing a pair of slidable connections between the sill frame and the inner end of the basket. When the grass in basket 24 is to be dumped, the sill frame carrying the basket is adapted to swing upwardly between side handle bars 22, moving about tie rod 12 as an axis until the sill frame reaches the upright dumping position of Fig. 7. As the sill frame approaches this position, the extensible connections provided by slotted links 42 and clips 44 permit the inner end of the basket to swing forwardly a limited distance about tie rod 39 as a pivot, as shown in Fig. 7. This insures that the entire load of grass will be discharged well forwardly of the mower, and not on top of it. This is particularly advantageous when it is desired to dump the grass from the grass catcher directly into another container, such as a box, a wheelbarrow, or a low wagon.

Tie rod 40, which is non-rotatable, is provided with a series of pins 45 normally projecting through a corresponding series of holes 46 in the bottom of basket 24 (Figs. 1 and 2). These pins prevent the grass from working forwardly in the basket when in its horizontal position. As the basket moves upwardly, towards the upright dumping position of Fig. 7, pins 45 still project into the basket, so as to retain the load of grass therein, until the basket starts to gravitate towards the position of Fig. 7. This causes withdrawal of the pins from the basket and permits free dumping of the load of grass forwardly of the mower. Pins 45 return to the normal position of Fig. 2 when the basket resumes its grass catching position.

In order to properly locate sills 25 on tie rod 12 and limit the forward swinging movement of the sills so that they will not pass beyond the grass discharging position of Fig. 7, a stop collar 47 is mounted on tie rod 12 adjacent the pivoted end of each sill. Collar 47 has a flange 48 formed with an arcuate lip 49, as appears particularly clearly in Fig. 5, where the collar is shown moved away from the sill end to reveal the details. Collar 47, when in operative position as shown in Fig. 4, is secured by a set screw 50 with its lip 49 projecting over the end of sill 25. The upper face 51 of lip 49 on each collar 47 is so located that it will be engaged by the corresponding sill 25 as the sills swing over the mower, and thus stop the grass catching mechanism in the dumping position of Fig. 7.

The means for utilizing the power derived from rotation of ground wheels 13 to effect the dumping operation of the grass catching means already explained, will now be described. This comprises duplicate mechanisms at opposite sides of the machine; hence only one set will be described. Encircling hub portion 14 of each traction wheel 13 is a clutch band 52, preferably lined. The extremities of band 52 are secured to cross pins 53, 54 mounted in the forked end portions 55, 56 of a clutch operating lever 57, these parts normally being disposed in the full line position of Fig. 2. The edge of side plate 11 extends between the clutch band and end portion 56 of lever 57 (as shown in Fig. 4) to insure retention of these parts in proper position. Normally pin 54 rests in a notch 58 (Fig. 7) in the edge of side plate 11 to prevent rattling and consequent wear on the parts, and to assist in maintaining them in proper operating position.

Each clutch lever 57 has an inwardly projecting pin 59 at its outer end and a lug 60 on its upper edge, the purposes of which are explained later. An elongated slot 61 in lever 57 receives a pin 62 on the upper end of a link 63 pivoted at its lower end to sill 25 by means of a bolt 64. A series of bolt holes 65 in sill 25 provide for adjustment of this pivotal connection to compensate for wear and tear on the parts. Link 63 also has a slot 66 with an open end 67 into which pin 59 on clutch lever 57 is adapted to pass, as explained later.

With the parts described in the normal, full line position of Fig. 2, clutch bands 52 are released so that they do not grip wheel hubs 14, and thus the ground wheels may rotate freely. However, when downward pressure is applied to the outer ends of levers 57, the bands gradually tighten up on the wheel hubs until, upon the levers reaching the dotted line position of Fig. 2, the bands firmly grip the hubs. If, at this time, the mower wheels are rolled forwardly, clutch bands 52 rotate therewith to swing their levers 57 bodily over the mower towards the position of Fig. 7.

When clutch lever 57 swings downwardly towards the dotted line or operative position of Fig. 2, link 63 also swings downwardly by reason of the pin and slot connection between the members. As lever 57 and link 63 approach operative position, pin 59 on lever 57 enters slot 66 at 67, pin 54 moves out of notch 58 in side plate 11 and, as a result of the increased tension on clutch band 52, pin 59 is drawn slightly forwardly in slot 66. Thus, the parts assume the dotted line position of Fig. 2, in which lever 57 and link 63 are in longitudinal alignment and pin 59 is lodged under tongue 68 forming one side of slot 66 in the link.

The slight forward movement of pin 59 in slot 66, which serves to locate pin 59 under tongue 68, is effected in part by the slight downward movement of sill 25 against resilient bumper 35 which occurs as a result of the downward pressure applied to the sill by link 63 when pin 59 is pressed against the bottom of slot 66. This causes sill 25 to pull link 63 towards the right and insures location of pin 59 under tongue 68. Upon removal of the downward pressure upon clutch lever 57, the lever, due to the tension of the band clutch, tends to swing upwardly about its pin 54 as a pivot and thus further aids in binding pin 59 against tongue 68 so as to prevent escape of the pin from the slot.

With the parts in the above described position, the clutches are tightly engaged with the wheel hubs, and clutch bands 52, levers 57 and links 63 form a pair of rigid, extensible connections between the wheel hubs and the outer portion of the sill frame which carries basket 24. Hence, when ground wheels 13 roll forwardly, clutch levers 57 and links 63 swing upwardly as though they are rigid parts of the wheels, and thus raise the sill frame and basket assembly between the handle bars 22, with the sill frame moving about tie rod 12 as an axis. As the upward movement of the basket continues, levers 57 and links 63 automatically extend to permit this movement, since pins 59 and 62 are free to slide in their slots 66 and 61. When the basket reaches the dumping position of Fig. 7, these pins reach the adjoining ends of their respective slots. This dumping position, which is determined by the angular position of collars 47 on tie rod 12, is such that clutch levers 57 do not swing forwardly sufficiently to release clutch bands 52.

Since the clutch bands in the position of Fig. 7 are still tightly engaging the wheel hubs, when the mower is retracted the sill frame and basket will be gradually swung backwardly by the reverse rotation of the ground wheels and lowered to the original position of Fig. 2, pins 59 and 62 again moving in their slots to permit this. As the sill frame reaches this position, due to the slight overrun of the wheel drums and the resultant rearward movement of clutch levers 57 by clutch bands 52, which latter are still gripping the drums, pins 59 are forced out from under tongues 68. The tension of bands 52 then causes levers 57 and links 63 automatically to swing upwardly to the full line position of Fig. 2. The clutches are thus automatically released and the basket remains in position to receive another load of grass as forward operation of the mower is continued.

The means by which the operator, when he desires, may cause clutch levers 57 to be depressed preparatory to dumping grass basket 24, are located partly on the basket and partly on the mower handle. At each upper front corner of the basket is mounted a bracket 69 by means of a channel portion 70 fitting over the reinforced edge of the basket. A headed pin 71 extends through suitable aligned openings in the basket, in braket 69 and in an angular extension 72 on the basket, and is secured in place by a cotter pin 73.

Rotatably mounted on pin 71 is a bell crank 74 having an upper arm 75 and a lower arm 76. Extension 72 of bracket 69 has a lip 77 which, as shown in Fig. 3, is normally engaged by arm 75 of bell crank 74, whereby clockwise movement of the bell crank is limited. A coil spring 78 mounted on pin 71 has one end engaging portion 72 of the bracket and its other end engaging arm 76 of the bell crank so as to yieldably hold the bell crank in the normal, inoperative position of Fig. 3.

Bell crank 74, which forms the depressing means for clutch lever 57, appears in its normal position in full lines in Fig. 2. Clutch lever actuating arm 76 of the bell crank overlies clutch lever 57, but is spaced therefrom to allow the basket lifting means freely to assume its normal full line position. If bell crank 74 is now rotated in a counter-clockwise direction by means of its arm 75, the end of arm 76 will move into contact with clutch lever 57, as indicated in dotted lines in Fig. 2. Continued rotation of the bell crank then causes arm 76 thereof to force lever 57 downwardly until pin 59 lodges under tongue 68 of link 63, as already explained. Lug 60 on lever 57 prevents counter-clockwise movement of the bell crank beyond this position (also shown in dotted lines in Fig. 2) so that, upon release of arm 75, the bell crank will be returned automatically to its normal position by the action of spring 78. At this time, the mower is ready to be pushed forwardly to cause dumping of the basket.

Carried by the mower handle are means which, when in operative position, are adapted upon depression of the handle by the operator to effect the desired counter-clockwise rotation of bell cranks 74 to prepare the grass catching means for the dumping operation. Each side handle bar 22 has a bell crank 79 pivotally mounted on the underside thereof by means of a bolt 80. Bell crank 79 has a short arm 81 and a long arm 82. A light, coil spring 83 on bolt 80 has one end engaging the long arm 82 of bell crank 79 and its other end engaging handle bar 22, as appears in Fig. 6, so that the spring normally yieldably holds the bell crank in inoperative position with its arm 82 beneath handle bar 22. This prevents interference with the basket and the parts which move therewith during the dumping operation.

A U-shaped supplemental pusher bar 84 is swingably supported at 85 and 86 beneath main pusher bar 21. A connecting rod 87 on each side of the mower, is pivotally connected at one end to arm 81 of bell crank 79 and at its opposite end is pivotally connected to the U-shaped pusher bar at 88. Springs 83 act on the bell cranks 79, rods 86 and bar 84 to normally maintain bar 84 in close association with main handle 21, but spaced therefrom sufficiently to prevent interference with the operator's hands when he grasps bar 21 to operate the mower.

When bar 84 is swung forwardly to the dotted line position of Fig. 2, each bell crank 79 is operated by rod 86 to swing arm 82 of the bell crank outwardly into the dotted line position of Fig. 6 against the resistance of spring 83. As a result of this movement, arm 82 engages the outer end of arm 75 of bell crank 74 and rotates the bell crank so that its lower arm moves into contact with clutch lever 57, as shown in dotted lines in Fig. 2. It will be noted that at this time bell crank arm 82 bears on the upper side of arm 75 forwardly of pin 71 on which bell crank 74 rotates.

With both bell crank arms 82 held in this position by means of bar 84, downward swinging movement of the mower handle will cause bell crank arms 82 to force bell crank arms 75 downwardly and thus continue the counter-clockwise movement of bell cranks 74, so as to move clutch levers 57 downwardly towards operative position. As the mower handle reaches the dotted line position of Fig. 2, bell cranks 74 are forced into their lowermost dotted line position to effect lodgment of pins 59 under tongues 63, ready for the dumping operation. The mower handle is now raised towards its normal, operative position and bar 84 released, as a result of which springs 83 move bell crank arms 82 under handle bars 22 and return handle bar 84 to the full line position of Fig. 2, while springs 78 return bell cranks 74 to their normal, full line position of Fig. 2. The mower may now be pushed forwardly to dump the grass basket, and then retracted to restore the basket and its dumping mechanism to the normal, grass receiving position, as already explained.

In use, assuming the parts are in the grass receiving position of Fig. 2, the mower is propelled forwardly by handle 21 until the basket is full. The mower is then pushed towards the place where the grass is to be dumped and, when within a few feet of the same, bar 84 is pushed forwardly to swing arms 82 from beneath the side handle bars 22 and operate bell cranks 74. The mower handle is then depressed to cause bell cranks 74 to operate levers 57, whereby the clutches are engaged and the sill frame carrying the grass basket is rigidly connected to the ground wheels 13.

Immediately upon raising the mower handle and releasing bar 84, bell cranks 74 and 79 are automatically returned to normal position and, as the forward movement of the mower is continued, the basket rises and swings forwardly to dump its contents at the desired point. The mower is then rolled backwardly a short distance to cause return of the basket to its normal, grass receiving position. As explained, this return movement renders the dumping mechanism inoperative until again conditioned for operation by actuation of bar 84 and handle 21, so that the mower may now be operated in the usual manner until the basket is again ready for dumping.

The grass catching and dumping device described is readily removed from the mower proper for repairs or replacements. First, the mower handle is dismounted by removing pins 20. The ground wheels 13 are then removed to free the clutch bands 52 and their levers 57. Upon loosening screws 31 so as to release arcuate members 28 on the inner ends of sills 25, the remainder of the attachment may be removed from the mower. Replacement of the catcher attachment and the mower handle is accomplished just as readily.

Although a practical embodiment of the invention has been illustrated and described, obviously various modifications thereof are possible without departing from the scope of the invention except as the same may be limited by the appended claims.

What is claimed is:

1. The combination in a lawn mower of a mower frame; ground wheels supporting the frame; grass cutting means on the mower frame; means for propelling the lawn mower; a grass receptacle for the mower adapted for bodily movement, relatively to the cutting means, between a normal, grass-catching position rearwardly of the cutting means and a grass dumping position at the front of the mower; and pivotal connecting means between said receptacle and the mower for guiding the receptacle in its bodily movements between said positions.

2. The combination of claim 1 further characterized in that the mower frame includes a pair of side plates having a tie rod located forwardly of the axis of the ground wheels, the connecting means between the receptacle and the mower comprises a swingable, receptacle-carrying frame including a pair of connected sills pivotally supported by said tie rod, and means are provided on the mower frame to prevent movement of the receptacle frame and the receptacle beyond said grass catching and dumping positions.

3. The combination in a lawn mower of a mower frame; ground wheels supporting the frame; grass cutting means on the frame; a receptacle mounted on the lawn mower to receive grass from the cutting means; means adapted for actuation by at least one of the ground wheels, when in operation, to dump said receptacle; and control means adapted for manual operation to cause said actuation of the dumping means.

4. The combination in a lawn mower of a mower frame; grass cutting means thereon; ground wheels supporting the mower frame; means for propelling the mower; a receptacle mounted on the mower for movement between a normal, grass receiving position at the rear of the grass cutting means, and a grass dumping position at the front of the mower; means adapted for actuation by the ground wheels, when in operation, to move said receptacle from grass receiving to grass dumping position; and control means adapted for manual operation to cause said actuation of the receptacle moving means.

5. The combination in a lawn mower of a mower frame; grass cutting means thereon; ground wheels for the mower frame having annular, rotatable surfaces; means for propelling the mower; grass catching means pivotally mounted on the mower for movement between a normal, grass receiving position rearwardly of the cutting means and a grass dumping position at the front of the mower; means adapted for actuation to couple the grass catching means to the wheels, whereby forward rotation of the wheels will swing the grass catching means from grass receiving to grass dumping position, said coupling means including band clutches adapted for actuation to grip said rotatable wheel surfaces; and means adapted for manual operation to actuate the coupling means, including the clutches.

6. The combination of claim 5 further characterized in that said coupling means, when actuated, remain in coupled condition until the grass catching means are returned to grass receiving position, whereby rearward rotation of the ground wheels will swing the grass catching means from dumping to receiving position, and means are provided on the mower for releasing said coupling means upon return of the grass catching means to grass receiving position.

7. The combination of claim 5 further characterized in that the mower propelling means comprises a bail-type handle pivotally connected to the mower and through which the grass catching means pass in swinging from grass receiving position to grass dumping position, and said manual actuating means for the coupling means include bell cranks pivotally mounted on the grass-catching means and adapted for operation to directly engage and actuate the coupling means, members pivotally mounted on the mower handle for manual movement into an operative position in which depression of the mower handle causes said pivoted members to directly engage and operate said bell cranks, and means on the handle for manually moving the pivoted bell crank operating members into said operative position.

8. The combination of claim 5 further characterized in that the coupling means also include actuating levers pivotally connected to the clutches and links pivotally connected to the grass catching means and each having a pair of extensible pin-and-slot connections with its corresponding clutch lever when the coupling means are in coupled condition, one of each of said pair of pin-and-slot connections being adapted to be broken automatically upon rearward movement of the mower to uncouple the coupling means.

9. In a lawn mower the combination of a mower frame; ground wheels supporting the frame; grass cutting means on the mower frame; means for propelling the lawn mower; a receptacle located rearwardly of the cutting means to receive grass therefrom; carrier means for the receptacle extending from the receptacle and attached to the mower frame forwardly of the axis of the ground wheels; and means for supporting the carrier means between said point of attachment and the receptacle.

10. The combination of claim 9 further characterized in that the mower frame includes a pair of side plates connected by a tie rod located forwardly of the axis of the ground wheels and to which the receptacle carrier means are pivotally connected, and the carrier supporting means are resilient so as to absorb ground shocks and thus protect the receptacle carrier during operation of the mower.

11. The combination of claim 9 further characterized in that the receptacle carrier means are pivotally attached to the mower frame and said supporting means for the carrier means are adjustable to vary the position of the carrier means in a vertical direction.

12. The combination in a lawn mower of a mower frame; ground wheels therefor; grass cutting means on the mower frame; propelling means for the mower; a receptacle; carrying means for said receptacle pivotally connected to the mower for moving the receptacle between a normal, grass receiving position at the rear of the cutting means and a grass dumping position at the front of the mower, said receptacle being pivotally connected at its outer end to the carrying means to permit forward swinging movement of the inner end of the receptacle away from the carrying means when the receptacle moves towards dumping position; and means for limiting said swinging movement of the receptacle.

13. The combination of claim 12 further characterized in that the receptacle carrying means have a series of grass retaining pins projecting into the inner end of the receptacle through a corresponding series of openings therein when the receptacle is in its grass receiving position, said swinging movement of the receptacle serving to remove the pins from the interior of the receptacle to permit free dumping of any grass located therein.

14. The combination in a lawn mower of a mower frame; ground wheels therefore having hubs; grass cutting means on the frame; a handle pivoted to the mower; a grass receptacle normally located in a grass receiving position at the rear of the cutting means; a carrier for the receptacle pivotally connected to the mower frame, said carrier being adapted for movement to swing the receptacle between said grass receiving position and a dumping position at the front of the mower; means adapted for actuation to couple the carrier to the wheels, whereby forward movement of the wheels will swing the receptacle from grass receiving to grass dumping position, said coupling means including band clutches adapted for actuation to engage said wheel hubs; and means adapted for operation by downward movement of the mower handle to actuate the coupling means, including the clutches.

15. The combination of claim 14 further characterized in that means are mounted on the grass receptacle for movement to actuate said coupling means; means are mounted on the mower handle for manual movement to an operative position in which depression of the mower handle will cause said manually movable means to operate the actuating means on the receptacle; and means, including a handle bar adjacent the mower handle, are provided for moving said manually operative means to said operative position.

16. The combination in a lawn mower of a mower frame; grass cutting means on the frame; means for driving the grass cutting means; a receptacle mounted on the lawn mower in a position to receive grass from the cutting means; means adapted for operation by the grass cutter driving means, when said driving means are in operation, to dump said receptacle; and control means adapted for manual operation to cause said actuation of the dumping means.

17. A grass catcher and dumping attachment for lawn mowers, having a bail-type propelling handle, grass cutting means and traction wheels, comprising a receptacle; means for connecting said receptacle to the lawn mower for operation through said handle between a normal, grass-receiving position at the rear of the mower and said cutting means and a dumping position at the front of the mower; and means on said attachment adapted to coact with the traction wheels of the mower, when in operation, to operate said receptacle between said receiving and dumping positions.

BAILEY C. CAUDRY.